United States Patent [19]

Buser et al.

[11] Patent Number: 5,576,619

[45] Date of Patent: Nov. 19, 1996

[54] METHOD AND APPARATUS USING AN ELECTRICAL SENSOR FOR MONITORING A MOVING MEDIUM

[75] Inventors: Dieter Buser, Birkenau; Wolfgang Frank, Viernheim, both of Germany

[73] Assignee: SIE Sensorik-Industrie-Elektronik GmbH, Viernheim, Germany

[21] Appl. No.: 309,939

[22] Filed: Sep. 21, 1994

[30] Foreign Application Priority Data

Sep. 21, 1993 [DE] Germany ............ 43 31 973.4

[51] Int. Cl.⁶ ................................. G01R 29/00
[52] U.S. Cl. .......... 324/76.79; 324/654; 324/686
[58] Field of Search ................ 324/654, 663, 324/664, 686, 689, 690, 76.79; 327/67, 74, 87; 73/290 R, 304 C

[56] References Cited

U.S. PATENT DOCUMENTS

| | | | |
|---|---|---|---|
| 3,461,382 | 8/1969 | Anderson | 324/76.79 |
| 4,119,918 | 10/1978 | Moser | 327/87 |
| 5,414,368 | 5/1995 | Ogawa et al. | 324/76.79 |

FOREIGN PATENT DOCUMENTS 4021164  11/1991  Germany.

Primary Examiner—Kenneth A. Wieder
Assistant Examiner—Diep Do
Attorney, Agent, or Firm—Horst M. Kasper

[57] ABSTRACT

A method is provided for the monitoring of a moving medium (1), in particular the measurement of the filling level in a container or the distance signal of an object (1) to be detected where a sensor (2) is employed. The sensor (2) is subjected at its input to a supply voltage source (Ubs) or a supply current source. In order to suppress relatively slowly changing interfering values, the output signal (Uas) of the sensor (2) is fed back in a feedback loop to the input of the sensor (2) or, respectively, to the supply voltage of the sensor (2). The feedback loop is formed such that the input supply voltage source (Ubs) of the sensor, which is changeable for adjustment of the sensitivity, changes in dependence on the output signal (Uas) of the sensor (2) such that a constant sensitivity is present at all times. In case of an occurrence of a sufficiently fast or, respectively, sufficiently jumpy change larger than 0.01 V/sec. of the output signal (Uas) of the sensor (2) relative to the quiescent output signal (Uw) in case of an absence or, respectively, in case of a presence or rest of the medium (1) in case of a spatial-geometrically moving medium (1), the feedback loop is broken up and interrupted and the interruption of the feedback loop is interpreted as a local change of the medium (1), where the local change is larger than 0.5 mm.

27 Claims, 5 Drawing Sheets

METHOD AND APPARATUS USING AN ELECTRICAL SENSOR FOR MONITORING A MOVING MEDIUM

BACKGROUND OF THE INVENTION

1. Field of the Invention

The invention relates to a method for the surveillance of a moving medium, in particular for the measurement of the filling level in a container or the distance signal of an object to be detected, by use of an electrical sensor, where the electrical sensor is subjected at its input to an adjustable supply-voltage source or to an adjustable supply-current source, and to a device for the performance of this method.

2. Brief Description of the Background of the Invention Including Prior Art

A number of capacity operating or inductively operating electrical sensors are known which usually contain a contactless and non-contacting operating initiator, where the initiator includes an RF oscillator in a blocking oscillator circuit with an active resonant LC circuit or RC oscillator circuit. If an LC initiator is present, the inductivity of the resonant LC circuit is formed as a coil with a radio frequency field aligned with the direction of the coil. If an electrically conducting medium is placed and positioned into the field, then a damping of the oscillator circuit occurs. The oscillation of the oscillator breaks off in case of a sufficiently large damping, depending on the distance of the medium from the coil of the resonant LC circuit, whereby this change of state is transformed into a switching command within an evaluator. If an RC initiator is present, then the sensor electrode is part of the capacitor of the RC oscillator circuit, wherein the capacity of the RC oscillator circuit is capable of changing in case of an approaching of an object with a sufficiently large dielectric constant value at the sensor electrode, whereby the RC oscillator circuit is stimulated to oscillate or whereby the oscillations break off and where the change of the oscillation amplitude can be evaluated in a following envelope detector. Switches with such sensors have the property that the switching distance depends on the material properties and the structure of the body to be detected.

An inductive proximity switch has become known from the German printed patent document DE 40 21 164, where the emitter and the collector of the oscillator transistor are bridged with a capacitor.

Such sensors are in general associated with the disadvantage that no uniform and constant sensitivity is assured based on the temperature dependence of the sensor properties. Thus, a leaving of and a change of the constant switching distance can occur or a stimulation of the oscillator can occur in case of a once performed adjustment of the sensor even before an object or medium is present in the response range. Thus, the switching distance of an approaching object is not constant over the temperature range for operation. Similarly, an application-specific adjustment of the sensor outside the specifications of the sensor can be required, which adjustment can frequently only be accomplished with extreme difficulties.

SUMMARY OF THE INVENTION

1. Purposes of the Invention

It is an object of the present invention to provide a proximity switch which operates substantially independent of interfering changes such as temperature changes.

It is a further object of the present invention to provide a proximity switch, which can be adapted to the specific approach speed of the object.

It is yet a further object of the present invention to provide a method which allows to discriminate between approaching objects.

It is another object of the present invention to provide a method and an apparatus of the initially recited kind, which allows that relatively slowly changing interference values such as, for example, changes in temperature, the wetting of a wall by a liquid medium or an oppositely disposed container wall, can be suppressed without a change of the switching distance of the sensor being associated therewith.

These and other objects and advantages of the present invention will become evident from the description which follows.

2. Brief Description of the Invention

According to the present invention, the purpose recited above is achieved in that the output signal of the sensor is fed back in a feedback loop to the input or, respectively, to the supply voltage of the sensor for the suppression of relatively slow changing interference values, where said slowly changing interfering values are capable of provoking a change of the output signal. Said change is less than ±0.5 V/min. or, respectively, relative to the temperature less than ±5° C./min., such as temperature and/or dusting and/or wetting. The feedback loop is formed such that the input supply voltage source Ubs of the sensor, which is changeable for adjustment of the sensitivity, changes in dependence on the output signal Uas of the sensor such that a most constant sensitivity possible is present at all times. Upon occurrence of a sufficiently fast or, respectively, sufficiently jumpy change, such as larger than 0.01 V/sec., of the output signal of the sensor relative to the quiescent output signal after absence or, respectively, upon presence of the medium in case of a spatial-geometrically moving medium, the feedback loop is opened and the interruption of the feedback loop is interpreted as a local change of the medium or of the approaching object, where the local change is larger than 0.5 mm.

An apparatus for monitoring a moving medium comprises an adjustable input supply voltage Ubs source. An electrical sensor having a first terminal is connected to the adjustable input supply voltage Ubs source and has a second terminal delivering an output signal Uas. The first terminal of the electrical sensor is subjected to an adjustable input supply voltage delivered from the adjustable input supply voltage Ubs source. A feedback loop is connected to the second terminal of the electrical sensor and to the adjustable input supply voltage Ubs source. The output signal Uas of the sensor is fed back in a feedback loop to the first terminal of the sensor for suppressing relatively slowly changing interference values. A sufficiently fast change of the output signal Uas of the sensor relative to a quiescent output signal Uw of the sensor, while a medium is absent or in a rest condition, opens up the feedback loop. The opening and interruption of the feedback loop is interpreted as a local change of the medium configuration.

The apparatus can be in particular provided for measuring a filling level in a container or a distance signal of an object to be detected. The feedback loop can include a switching element. The output signal Uas of the sensor can be within a range of from about 0 to 5 volts. The output signal Uas can be fed back through the switching element to the first terminal of the sensor in case of a voltage change au of more than 40 mV/sec. The switching element is capable of opening up the feedback loop toward the supply voltage source Ubs upon a sufficiently quick or, respectively, sufficiently jumpy change of the output signal Uas of more than 0.01 V/sec. of the sensor for purposes of separating the supply voltage source Ubs from the sensor.

The switching element can include a Schmitt trigger and a comparator, where in each case the output signal Uas of the sensor can be applied to an input of the Schmitt trigger and to an input of the comparator. An output of the comparator can deliver a control signal in the feedback loop. A switching section of a first switch can be placed in the feedback loop following to the supply voltage source Ubs or supply current source. The first switch can be controlled by an output of the Schmitt trigger. The output signal Ua of the apparatus can be taken off from the output of the Schmitt trigger.

The sensor can be a capacitive sensor and can be disposed following to a charging pump. A low pass filter can be disposed following to the sensor. The output of the comparator can be applied to a change-over switch. The supply voltage for the capacitor of the charging pump can be connected at a second terminal of the change-over switch through a charging resistor. A discharge resistor can be connected at a third terminal of the change-over switch. The first terminal of the change-over switch delivering a common output can be applied to the first switch. The capacitor of the charging pump can follow to the first switch. The supply voltage Ubs of the sensor can be disposed within a fluctuation width.

A low-pass filter can be connected to the second terminal of the electrical sensor and can have an output. A rectifier can be connected to the output of the low-pass filter and can have an output. The low-pass filter and the rectifier can generate a dc voltage from the high-frequency output voltage Uas of the sensor being disposed at a frequency in the region of from about 0.1 MHz to 5 MHz. An impedance converter can be connected to the output of the rectifier for delivering a rectified output signal Ue having a value of from about 0 to 5 volts. The output signal Uas of the sensor can be led through the low pass filter and then through the impedance converter.

The reference input of the automatic control, which is placed to the lower threshold value Us of the comparator, can be the quiescent output signal Uw of the sensor in case of an absence or rest position of the medium. The quiescent output signal Uw can be selected to be small and disposed in a range of up to 10% of a maximum dc voltage $U_{emax}$ at the rectified output signal Ue. The dc voltage $U_e$ at the rectified output signal can be proportional to an absolute value of the output signal of the sensor 2.

The discharge resistor of the change-over switch can be from about 100 to 1000 times larger than the charging resistor.

The sensor can be an inductive sensor or a light-sensitive sensor.

The invention method and the invention apparatus are associated with the advantage that slowly changing interference values can be effectively suppressed and faded out by the automatic control of the sensor within an operational loop. The change of the interference value, such as temperature and/or dusting and/or wetting, is less than ±0.5 V/min or, respectively, relative to temperature less than ±5° C./min. In particular, it is possible according to the present invention to suppress practically completely a variation based on a temperature dependence of the sensor as well as of the apparatus to be connected to the output of the device so that the sensitivity of the device no longer exhibits any further dependency on the temperature. Furthermore, the method and the apparatus eliminate negative influences during the production of the device such as, for example, varying hardening processes of the cast masses during the production of the sensors, in particular where parts of the sensors are cast from plastic, whereby a subsequent correction of the switching points is substantially eliminated.

A further advantage of the present invention is provided in that the sensitivity can now be followed over a wide region in such a device because the feedback loop is designed such that the input supply voltage, which is variable for the sensitivity adjustment, is changeable such dependent on the output signal of the sensor, that a constant as possible sensitivity is given at all times. In principle, the feedback loop represents a negative coupling or counter coupling as viewed over the entire action cycle of the device.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown possible embodiments of the present invention.

DESCRIPTION OF THE INVENTION AND PREFERRED EMBODIMENTS

Figure 1:
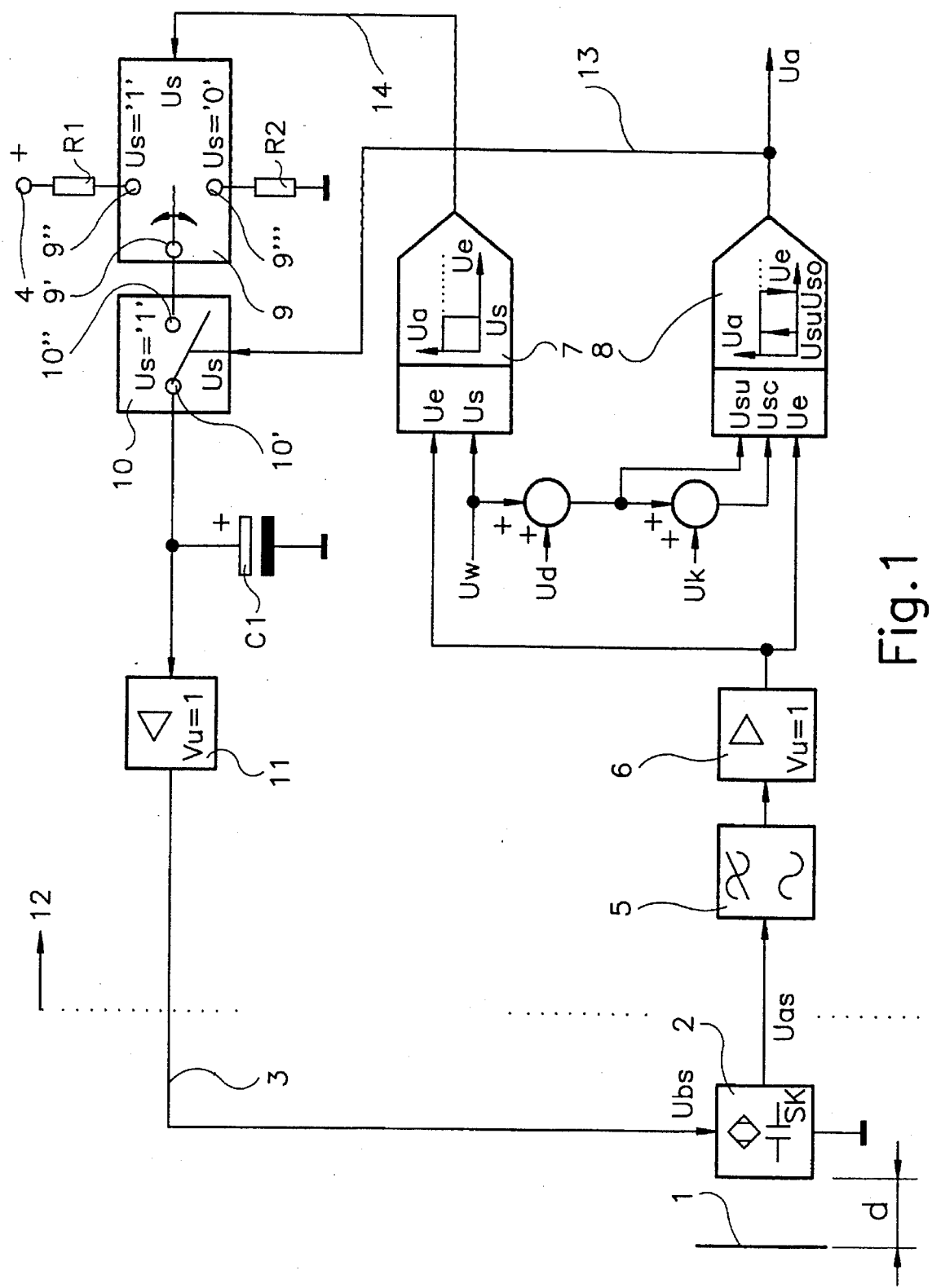
FIG. 1 is a view of a schematic electrical block diagram of the circuit of the sensor and of the apparatus to be connected to the output.

The present invention provides for a method for a monitoring of a moving medium 1, in particular measuring a filling level in a container or a distance signal of an object 1 to be detected, under employing of an electrical sensor 2. The electrical sensor 2 is subjected at its input indirectly to an adjustable input supply voltage source Ubs or an input supply current source. The output signal Uas of the sensor 2 is fed back in a feedback loop 7, 14, 9, 10 to the input of the sensor 2 or, respectively, to the supply voltage Ubs of the sensor 2 for a suppression of slowly changing interfering values. Said slowly changing interfering values are capable of provoking a change of the output signal, where said change is less than ±0.5 V/min. or, respectively, relative to the temperature less than ±5° C./min., such as temperature and/or dusting and/or wetting. The feedback loop is formed such that the input supply voltage source Ubs of the sensor, which is changeable for adjustment of the sensitivity, changes in dependence on the output signal Uas of the sensor 2 such that a substantially constant sensitivity is present at all times. Upon occurrence of a sufficiently fast or, respectively, sufficiently jumpy change, such as larger than 0.01 V/sec., of the output signal Uas of the sensor 2 relative to the quiescent output signal Uw after absence or, respectively, upon presence of the medium 1 in case of a spatial-geometrically moving medium 1, the feedback loop is opened and the interruption of the feedback loop is interpreted as a local change of the medium 1, where the local change is larger than 0.5 mm.

The change of the output signal Uas of the sensor 2 can be subjected to a threshold value measurement. Upon reaching of a predetermined threshold value, the feedback loop can be opened up toward the supply voltage source Ubs or the supply current source for separating the supply voltage source Ubs or the supply current source from the sensor 1.

A spatial geometric movement of the medium 2 can be interpreted as standstill in case a variation of the output voltage ΔUas of the sensor is smaller or equal to an absolute value of 40 mV.

An apparatus for monitoring a moving medium 1, in particular for measuring a filling level in a container or a distance signal of an object 1 to be detected, includes an electrical sensor 2. The input of the electrical sensor is subjected to an adjustable input supply voltage source Ubs or an input supply current source. The output signal Uas of the sensor 2 is fed back in a feedback loop to the input of the sensor 2 for suppressing relatively slowly changing interference values. A sufficiently quick or jumpy change of the output signal Uas of the sensor 2 relative to a quiescent output signal Uw in absence or rest of the medium 1 opens up the feedback loop. The interruption of the feedback loop is interpreted as a local change of the medium 1.

The output signal Uas of the sensor 2 can be fed back through a switching element 7, 8 to the input of the sensor 2, where the value of the output signal Uas is between zero to 5 volts, in case of a voltage change having an absolute value Δu smaller than 40 mV. The switching element 7, 8 is capable of opening up the feedback loop relative to the supply voltage source Ubs or the supply current source in response to a sufficiently quick or, respectively, a sufficiently jumpy change of a value larger than 0.01 mV/sec of the output signal Uas of the sensor 2 for purposes of separating the supply voltage source Ubs or the supply current source from the sensor 2.

The switching element can include a Schmitt trigger 8 and a comparator 7, where in each case the output signal Uas of the sensor 2 is applied to an input of the Schmitt trigger 8 and to an input of the comparator 7. The output of the comparator 7 can form the feedback loop. A switching section of a switch 10 can be placed in the feedback loop following to the supply voltage source Ubs or supply current source. The switch 10 can be controlled by an output of the Schmitt trigger 8. The output signal Ua can also be taken off from the output of the Schmitt trigger 8.

The sensor 2 can be a capacitive sensor 2 and can follow to a charging pump C1; R1. A low-pass filter 5 can follow to the capacitive sensor 2. The output of the comparator 7 can be applied to a change-over switch 9. The supply voltage for the capacitor C1 of the charging pump C1; R1 can be connected at one contact 9" of the change-over switch 9 through a charging resistor R1. A discharge resistor R2 can be connected at a third contact 9'" of the change-over switch 9. The common output 9' of the change-over switch 9 can be applied to the switch 10. The capacitor C1 of the charging pump C1; R1 can follow to the switch 10. The supply voltage Ubs of the sensor 2 can be disposed within a fluctuation width.

The output signal Uas of the sensor 2 can be led through a rectifier and a low-pass filter 5. The rectifier and the low-pass filter 5 can generate a direct current voltage from the high-frequency output alternating voltage Uas of the sensor, where the frequency of the alternating voltage Uas is in a region between f=0.1 MHz–5 MHz. The direct current voltage can then be passed through an impedance converter 6 and is available as rectified output signal Ue having a value between zero and 5 volts.

Preferably, the command variable of the automatic control, which is placed to the lower threshold value Us of the comparator 7, is the quiescent output signal Uw of the sensor 2 in case of an absence or rest of the medium 1. The quiescent output signal Uw can be selected to be small and can be in the region of 10% of the maximum direct current voltage $U_{emax}$, $Uw \approx 1/10\ U_{emax}$. The direct current voltage $U_e$ after the impedance convertor 6 can be proportional to the output signal Uas of the sensor 2 and is preferably between zero and 5 volts.

A resistance of the discharge resistor R2 of the change-over switch 9 can be in a region of from 100 to 1000 times larger than the resistance of the charging resistor R1, where $R2 \approx (100 \ldots 1000) \times R1$.

Figure 4:
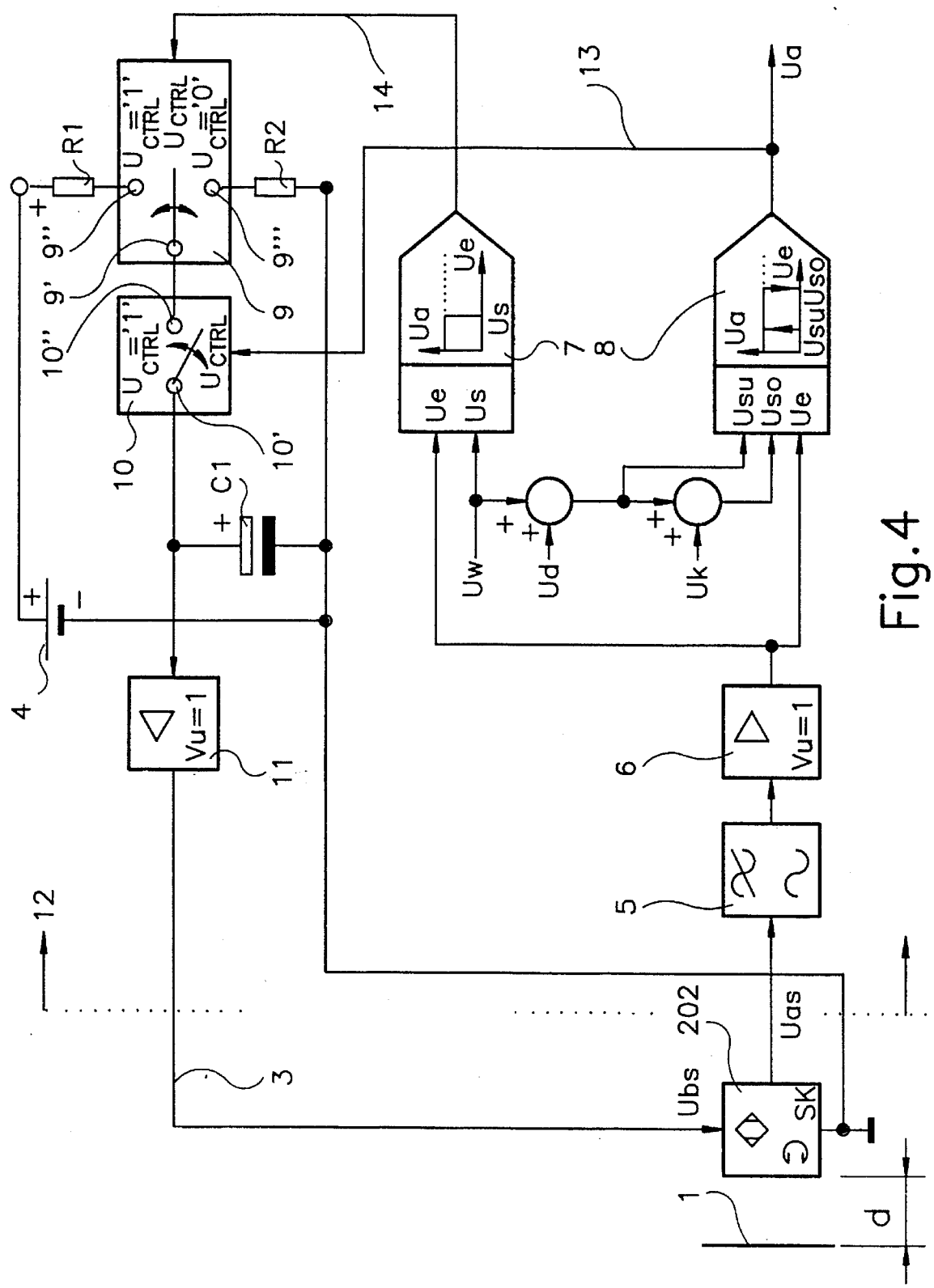
FIG. 4 is a view of a schematic electrical block diagram of the circuit employing and inductive sensor.
Figure 5:
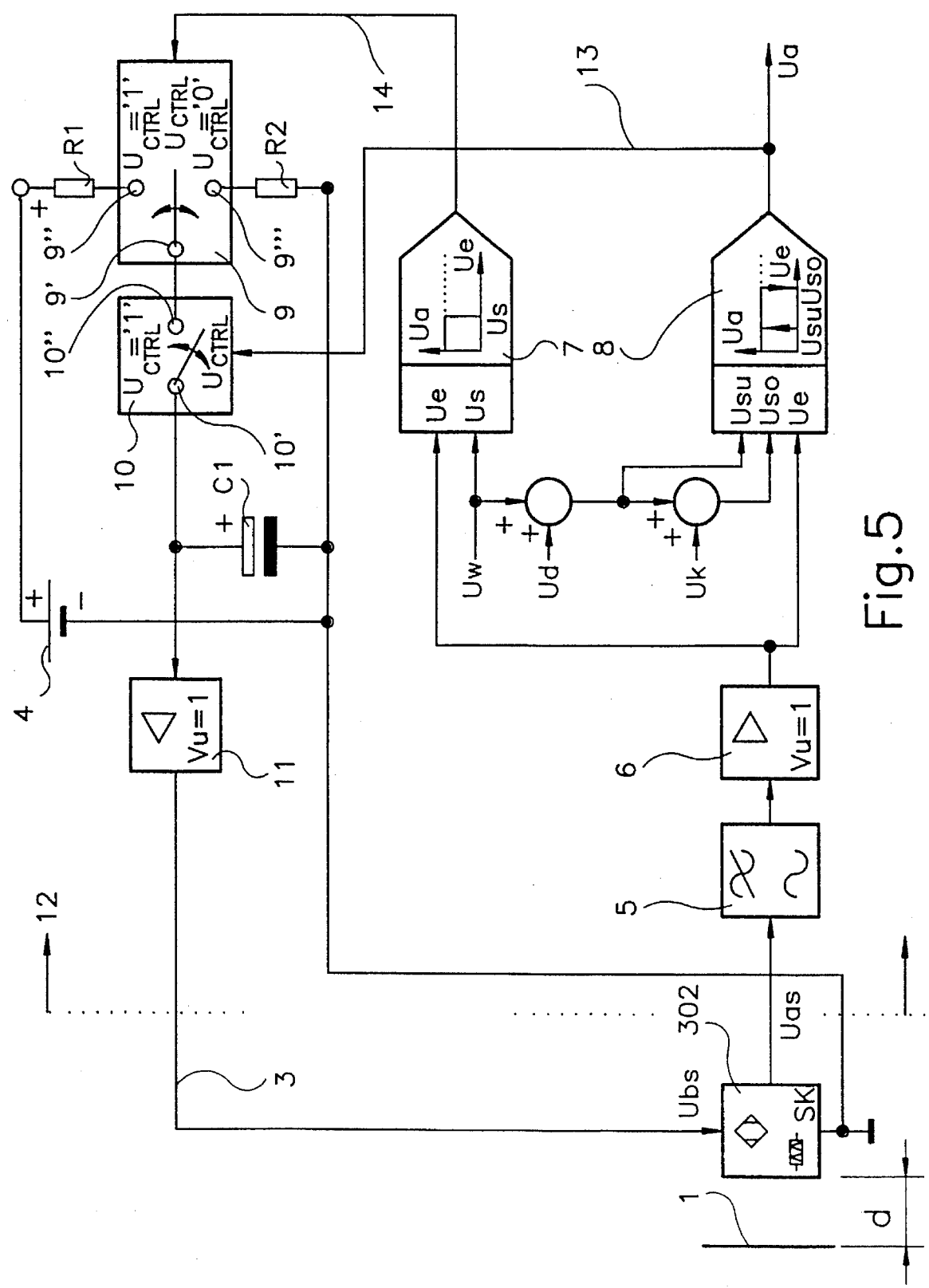
FIG. 5 is a view of a schematic electrical block diagram of the circuit employing a light-sensitive sensor.

The invention method is illustrated by FIG. 1 in connection with the embodiment of a device with a capacitive distance sensor or a filling level sensor. The invention method, however, is not limited to capacitive sensors but can also be employed in connection with inductive sensors 202, as shown in FIG. 4, and light-sensitive sensors 302, as shown in FIG. 5, light barriers or photoelectric barriers.

A capacitive sensor 2 comprises a sensor electrode and is connected to output of a charging pump C1-R1. The capacity of the capacitor C1 amounts to between about 25 and 45 microfarad and is preferably about 33 μF. Preferably, the charging resistor R1 amounts to between 1 and 10 KOhm. Upon a spatial-geometric approach or distancing of an object 1 toward or, respectively, away from the sensor electrode of the sensor 2, the charging pump C1-R1 can be stimulated to oscillations or, vice versa, oscillations which are present can be interrupted. Thus, an influencing of the amplitude-adjustable sensor occurs within the distance d between the object 1 from the sensor 2. Preferably, the structure of the sensor 2 is such that the sensor 2 or, respectively, the sensor electrode is separated from all output-connected device components or, respectively, device elements which are connected to the output, where these device parts or, respectively, device elements are collected in an apparatus 12 to be connected to the output of the sensor 2. The apparatus 12 includes everything after the elements 1, 2, and 3 shown in FIG. 1, where the apparatus 12 can further include elements, which can be connected to the arrow Ua shown in the lower right-hand corner in FIG. 1.

Figure 3:
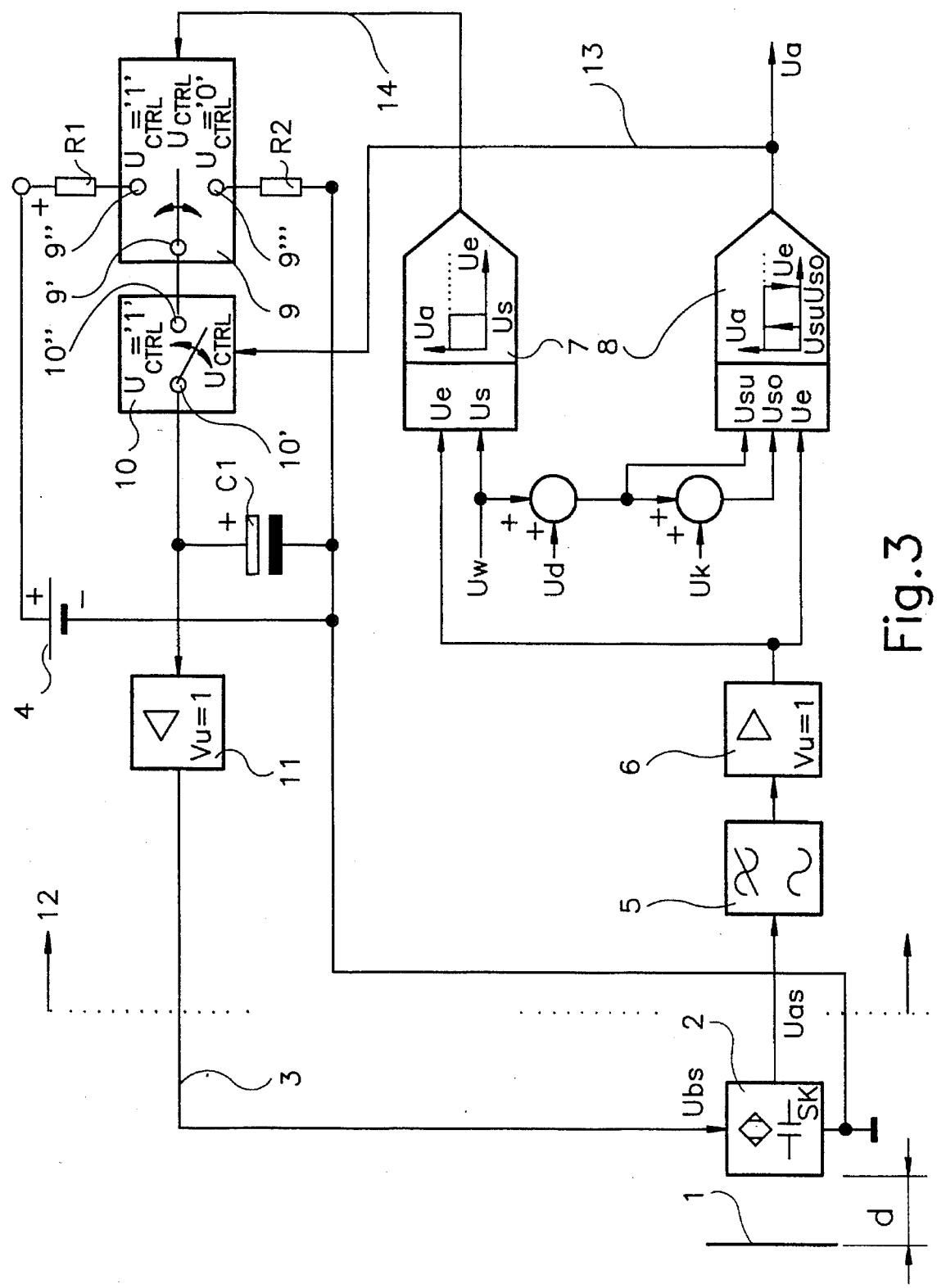
FIG. 3 is a complete schematic electrical block diagram of a device.

An input supply voltage Ubs is applied at the sensor where the input supply voltage Ubs is derived from a voltage source 4 and flowing through the charging resistor R1, a change-over switch 9 with the switching contacts 9', 9", 9"', a switch 10 with the switch contacts 10', 10", and through an impedance converter 11. The output voltage Uas of the sensor 2, where the frequency is in a region between f=0.1 MHz–5 MHz, is fed simultaneously through a rectifier, a low pass filter 5, and an impedance converter 6 and is available at an output of the impedance converter 6 as rectified output voltage $U_e$ and in fact the output voltage $U_e$ can assume a value from about zero volt to 5 volts. The rectified output voltage $U_e$ is fed simultaneously to a comparator 7 and to a Schmitt trigger 8. The Schmitt trigger 8 delivers at its output an inverted output switching signal Ua. Simultaneously, the output of the Schmitt trigger 8 is applied through a conduit line 13 to the switching path or, respectively, to the normally-open contact NOC 10', 10" of the switch 10 for effecting the switching process such that no galvanic connection to the conduit line 13 is present between the closing element of the switch 10 or, respectively, the contacts 10', 10", but rather switching is performed for example through a relay (FIG. 3). This input of the switch 10 is designated as voltage-controlled input with $U_{CTRL}$.

The output of the comparator 7 is connected through a conduit line 14 to the input of the change-over switch 9 for effecting the change-over switching process likewise such that no galvanic connection to the conduit line 14 is present between the change-over switch 9 or, respectively, the contacts 9', 9", 9"', but rather switching is performed through a relay (FIG. 3). This input as well is designated as voltage-controlled input with $U_{CTRL}$. The voltage source 4 is connected to a contact 9" of the change-over switch 9 through the charging resistor R1. A discharge resistor R2 is connected to ground and to the second contact 9"' of the change-over switch 9. The common output 9' of the change-over switch 9 leads to a contact 10" of the switch 10. The other contact 10' of the switch 10 leads to the capacitor C1, and the voltage signal is applied to the sensor 2 from the capacitor C1 through the impedance converter 11 and the line 3.

The operating principle of the invention apparatus is based on an inert and slowly following automatic control of the output voltage of the sensor 2 up to the point in time where the spatial-geometrically approaching object or leaving object 1 is recognized. It is to be assumed that the oscillator circuit is without external stimulation through the object 1 or the medium to be captured in the starting condition of the system; the capacitor C1 is discharged and the system is present in switched-on ready state, wherein the switch 10 is closed and the sensor 2 connected to the voltage source 4 through the charging resistor R1 and the switches 9, 10. At the point in time the system is switched on, the sensitivity is at a zero level.

The output voltage Uas of the sensor 2 is available as voltage $U_e$ after the output of the impedance converter 11 and passes to the input of the comparator 7 and to the input of the Schmitt trigger 8. If in this case the lower threshold of the Schmitt trigger 8 falls below $$Usu = Uw + Ud,$$

where Usu is the lower threshold voltage of the Schmitt trigger, where Uw is the ready state sensor output signal where Ud is the difference voltage between the lower threshold voltage of the Schmitt trigger 8 and the comparison input voltage Uw of the comparator 7, then the switch 10 is closed, which means that the capacitor C1 is connected through the change-over switch 9 and the charging resistor R1 to the voltage source 4; the input supply voltage Ubs of the sensor 2 increases exponentially until the maximum sensitivity is reached. If the input supply voltage Ubs is sufficiently large, then the oscillator starts to oscillate and the output voltage Uas of the sensor 2 increases.

Figure 2:
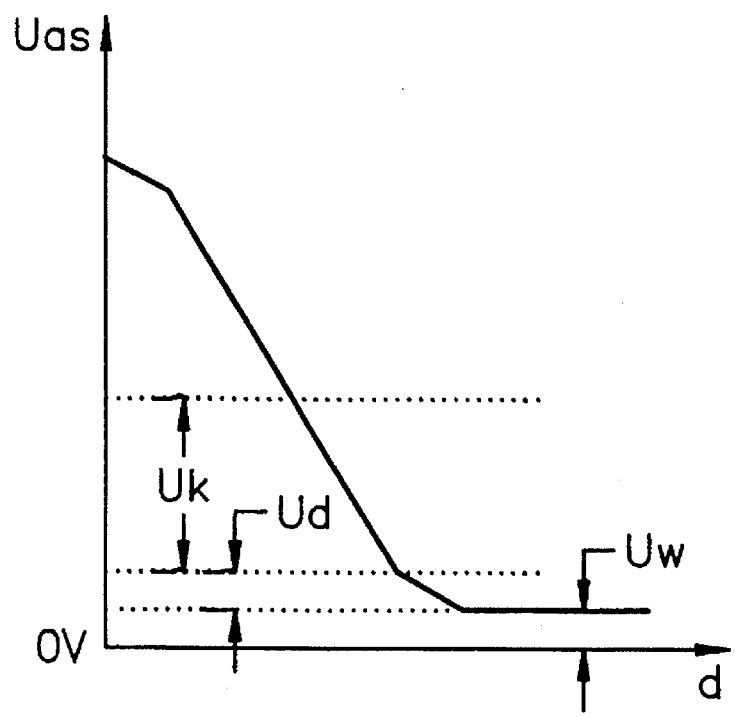
FIG. 2 is a schematic plot of the supply input voltage of the sensor versus the distance.

If the value of the command variable Uw is surpassed, as shown in FIG. 2, by the input supply voltage Ubs, then a switch impulse is applied to the change-over switch 9 through the comparator 7, where the switch impulse effects that the change-over switch 9 switches the connection of terminal 9' from the charging resistor R1 to the discharging resistor R2. The switch 10 continues to remain closed. Since the switch 10 continues to be closed, the capacitor C1 is discharged through the contacts 9', 9"'and through the discharge resistor R2, where the discharge resistor R2 is very highly resistive relative to the charging resistor R1. In this case, the discharge resistor R2 of the change-over switch 9 can have a resistance which is between 100 to 2000 times larger than the resistance of the charging resistor (R1), where $R2 \approx (100 \ldots 2000) \times R1$. A typical value of the resistance of the discharge resistor R2 amounts to 1 MOhm. The input supply voltage Ubs of the sensor 2 decreases when the capacitor C1 is discharged, and the output voltage Uas or, respectively, $U_e$ of the sensor 2 falls until the output voltage Uas falls below the comparator threshold Us of the comparator 7. In this case the comparator 7 furnishes a switching pulse to the change-over switch 9, where the switching pulse switches the change-over switch 9 again to "charging" such that the voltage of the voltage source 4 can again pass through the charging resistor R1, through the contacts 9', 9" of the change-over switch 9, and through the switch 10 to the capacitor C1. The input supply voltage Ubs of the sensor 2 thus takes a course restricted to stay within a fluctuation width. The fluctuation width is typically between about 20 millivolts and 40 millivolts.

If the object 1 or the medium to be captured approaches the sensor 2 sufficiently fast, then the output voltage Uas of the sensor 2 increases. Based on a high ohmic resistance value of the discharge resistor R2 and the large capacity of the capacitor C1, the control circuit is, however, relatively inert and slowly responding. The resistance value of the discharge resistor R2 amounts to between about 0.7 to 2 MOhm and is preferably 1 MOhm. The capacity of the capacitor C1 is between about 25 μF and 45 μF, and preferably about 33 μF. If now the upper threshold Uso of the Schmitt trigger 8 is surpassed by the output voltage Uas, then the output of the Schmitt trigger 8 switches, whereby the switch 10 is broken up, opened and interrupted and whereby the capacitor C1 is separated from the change-over switch 9. The automatic control is thereby switched off and the object 1 or the medium to be captured is recognized.

The automatic control is only activated again, when the object 1 or the medium moves out of the capturing region d of the sensor and whereby a fall of the output voltage Uas of the sensor 2 occurs to below the lower threshold Usu of the Schmitt trigger 8, or, based on self-discharge of the capacitor C1, the input supply voltage Ubs of the sensor 2 has fallen so far that thereby the output voltage Uas of the sensor 2 or, respectively $U_e$ has fallen below the value Usu. The thereby generated switching pulse of the Schmitt trigger 8 closes again the switch 10 such that the voltage supplied by the voltage source 4 can pass again through the charging resistor R1 and the change-over switch 9 to the capacitor C1.

A high sensitivity, namely $\Delta u \approx 0.05$ volt to 0.1 volt, is obtained by selecting the voltage level distance between the upper threshold of the Schmitt trigger 8 and the output voltage of the sensor 2 to be a small voltage level distance. The apparatus 12 to be connected to the output of the sensor 2 represents in connection with the sensor an automatic control circuit, wherein the automatic control has an influence on the automatic control value, i.e. the output voltage Uas of the sensor 2, only in such a situation where the switch 10 is closed. The reference input of the automatic control is the voltage Uw, which is preferably selected to be very small, namely in the region $Uw \approx 0.4$ volt to 0.6 volt, in order to achieve largest possible changes of the output voltage Uas when an approaching object is to be registered. The largest possible changes of the output voltage amount to a maximum of 5 volts, $Uasmax \approx 5$ volts. Preferably, the value of the reference input Uw is a constant value, and a preferred value is $Uw \approx 0.5$ volt.

The input supply voltage source Ubs of the sensor 2 is changeable for the adjustment of the sensitivity of the sensor 2. The feedback loop through which the output signal Uas of the sensor 2 or, respectively, the rectified output voltage $U_e$ for the suppression of relatively slowly changing interfering values are fed back to the input of the sensor 2 or, respectively, to the supply voltage of the sensor 2 is designed such or, respectively, the signal is fed back such that the input supply voltage source Ubs of the sensor 2 changes dependent on the output signal Uas of the sensor 2 or, respectively, on the rectified output voltage $U_e$ such that a substantially constant sensitivity of the sensor 2 is present at all times. The sensitivity adjustment is based on the change of the supply voltage of the sensor such that the higher the supply voltage is the sensitivity becomes higher. In principle, the feedback loop represents a negative coupling or counter coupling relative to the output signal Uas as viewed over the entire action cycle of the device. Upon occurrence of a sufficiently fast or, respectively, sufficiently jumpy change, such as larger than 0.01 V/sec., of the output signal Uas of the sensor 2 or, respectively, of the rectified output voltage $U_e$ relative to the quiescent output signal Uw after absence or, respectively, upon presence of the medium 1 in case of a spatial-geometrically moving medium 1, then the feedback loop is opened and the interruption of the feedback loop is interpreted as a local change of the medium 1, where the local change is larger than 0.5 mm. Interfering values which change relatively slowly, such as temperature and/or dusting and/or wetting are such changing interfering values which are capable of provoking a change of the output signal Uas of the sensor 2 or, respectively, of the rectified output voltage $U_e$, where these voltage changes are smaller than an absolute value of ±0.5 V/min. or, respectively, relative to the temperature smaller than an absolute value of ±5° C./min. A jumplike change is present for example in the case of a change which is larger than 10 mV/sec.

A slow spatial-geometric motion of the medium 1 is interpreted as a standstill or, respectively, not recognized as a motion by the sensor 2 when the fluctuation $\Delta$ of the output voltage $\Delta$Uas of the sensor 2 or, respectively, of the rectified output voltage $\Delta U_e$ is smaller than or equal to an absolute value of 40 millivolts.

The reference value of the automatic control, which is disposed on the lower threshold Us of the comparator 7, is the rest output signal Uw of the sensor 2 upon absence of the medium 1 or upon standstill of the medium 1. The rest output signal Uw is selected to be small and is in the region of 10% of the maximum direct current voltage $U_{emax}$ of the rectified output voltage $U_e$ available after the impedance converter 6, and therefore Uw≈1/10 $U_{emax}$. The direct current voltage $U_2$ after the impedance converter 6 is proportional to the output signal Uas of the sensor 2 and amounts preferably to between zero and 5 volts. The sensor is an inductive sensor or a light-sensitive sensor.

In a case where loose, abrasive materials or goods are present, a dusting of the sensor can occur in that minute dust particles deposit on the sensor, where such dusting results in slowly changing interfering values. Slowly changing interfering values can also occur in case of level measurements of liquids based on a high air humidity within a container, where a wetting of the sensor occurs in that minute liquid droplets precipitate onto the sensor.

FIG. 3 shows a complete block circuit diagram of a device with the courses of the supply lines of the voltage source 4.

The invention is applied in the field of the measurement of a filling level in a container or as a distance indicator of a spatial-geometrically moving object to be detected. The usefulness of the invention is in particular given in that the automatic control of the sensor is capable of effectively suppressing and fading out interfering values, such as temperature and/or dusting and/or wetting, which change slowly within an action cycle. A temperature variation of the sensor as well as of the apparatus to be connected to the output of the device can be practically completely suppressed such that the sensitivity of the device no longer exhibits a dependence on the temperature. Additionally, the sensitivity can be guided over a wide range.

It will be understood that each of the elements described above, or two or more together, may also find a useful application in other types of quality control systems and methods differing from the types described above.

While the invention has been illustrated and described as embodied in the context of a method for the surveillance of a moving medium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method for a monitoring of a moving medium comprising employing an electrical sensor;

connecting a first terminal of the electrical sensor to an adjustable input supply voltage source (Ubs) and subjecting the electrical sensor to an adjustable input supply voltage delivered by the adjustable input supply voltage source (Ubs);

feeding an output signal (Uas) of the electrical sensor back in a feedback loop to the first terminal of the electrical sensor for a suppression of slowly changing interfering values which are capable of generating a change of the output signal (Uas) which change is less than an absolute value of ±0.5 V/min as referred to voltage and which change is less than an absolute value of ±5° C./min as referred to temperature wherein the output signal (Uas) is changed together with changing a position of a moving medium to be detected, and wherein the feedback loop changes the changeable input supply voltage of the electrical sensor depending on the output signal of the electrical sensor such that the sensitivity of the electrical sensor substantially remains constant;

opening the feedback loop upon occurrence of a sufficiently fast change of the output signal (Uas) of the electrical sensor of more than 0.1 V/sec in case of a change of the position of a medium and representing a signal jump relative to the quiescent output signal (Uw) in absence or rest of the medium upon a spatially-geometric motion of the medium; and interpreting the opening and interruption of the feedback loop as a local change of the medium position.

2. The method, according to claim 1, further comprising measuring the position of the moving medium to be detected;

subjecting a change of the output signal (Uas) level of the electrical sensor to a threshold value measurement;

opening the feedback loop toward the supply voltage source (Ubs) upon reaching a predetermined threshold value for separating the supply voltage source (Ubs) from the electrical sensor.

3. The method, according to claim 1, further comprising interpreting a spatially-geometric motion of the medium as a resting state, where the variation of the output signal (Uas) of the electrical sensor is smaller or equal to an absolute value of 40 mV.

4. An apparatus for monitoring of a moving medium, comprising an adjustable input supply voltage (Ubs) source;

an electrical sensor having a first terminal connected to the adjustable input supply voltage (Ubs) source and having a second terminal delivering an output signal (Uas) changed together with changing a position of a moving medium to be detected, wherein the first terminal of the electrical sensor is subjected to an adjustable input supply voltage delivered from the adjustable input supply voltage (Ubs) source;

a feedback loop connected to the second terminal of the electrical sensor and to the adjustable input supply voltage (Ubs) source, wherein the output signal (Uas) of the sensor is fed back in the feedback loop to the first terminal of the electrical sensor for suppressing relatively slowly changing interference values of the output signal (Uas), and wherein a sufficiently fast change of the output signal (Uas) of the electrical sensor relative to a quiescent output signal (Uw) of the electrical sensor, while the medium is absent or in a rest condition, opens up the feedback loop, and wherein opening and interruption of the feedback loop is interpreted as a local change of a medium configuration.

5. The apparatus according to claim 4, wherein the feedback loop includes a switching element, wherein the output signal (Uas) of the sensor is within a range of from about 0 to 5 volts, wherein the output signal (Uas) is fed back through the switching element to the first terminal of the electrical sensor in case of a voltage change (Δu) of less than 40 mV/sec., wherein the switching element is capable of opening up the feedback loop toward the supply voltage source (Ubs) upon a sufficiently quick or, respectively, sufficiently jumpy change of the output signal (Uas) of more than 0.01 V/sec. of the sensor for purposes of separating the supply voltage source (Ubs) from the sensor.

6. The apparatus according to claim 5, wherein the switching element includes a Schmitt trigger and a comparator, where the output signal (Uas) of the electrical sensor is applied to an input of the Schmitt trigger and to an input of the comparator, wherein an output of the comparator delivers a control signal in the feedback loop, wherein a switching section of a first switch is placed in the feedback loop following to the supply voltage source (Ubs) or supply current source, wherein the first switch is controlled by an output of the Schmitt trigger.

7. The apparatus according to claim 6, further comprising a charging pump, wherein the electrical sensor is a capacitive sensor, where the capacitive sensor is disposed following to the charging pump (C1; R1);

a low-pass filter disposed following to the electrical sensor;

wherein the output of the comparator is applied to a change-over switch, wherein the supply voltage for a capacitor of the charging pump is connected at a second terminal of the change-over switch through a charging resistor, and wherein a discharge resistor is connected at a third terminal of the change-over switch, and wherein the first terminal of the change-over switch delivering a common output is applied to the switching section of the first switch, wherein the capacitor of the charging pump follows to the first switch, and wherein the supply voltage (Ubs) of the electrical sensor is disposed within a fluctuation width.

8. The apparatus according to claim 6, further comprising a low-pass filter connected to the second terminal of the electrical sensor and having an output;

a rectifier connected to the output of the low-pass filter and having an output, wherein the low-pass filter and the rectifier generate a dc voltage from the high-frequency output voltage (Uas) of the electrical sensor being disposed at a frequency in the region of from about 0.1 MHz to 5 MHz; an impedance converter connected to the output of the rectifier for delivering a rectified output signal (Ue) having a value of from about 0 to 5 volts, wherein the output signal (Uas) of the electrical sensor is led through the low pass filter and then through the impedance converter.

9. The apparatus according to claim 8, wherein the reference input of the automatic control, which is placed to the lower threshold value (Us) of the comparator, is the quiescent output signal (Uw) of the sensor in case of an absence or rest of the medium, and wherein the quiescent output signal (Uw) is selected to be small and disposed in a range of up to 10% of a maximum dc voltage ($U_{emax}$) at the rectified output signal (Ue), and wherein the dc voltage ($U_e$) at the rectified output signal is proportional to an absolute value of the output signal of the electrical sensor (2).

10. The apparatus according to claim 6, wherein the discharge resistor of the change-over switch is from about 100 to 1000 times larger than the charging resistor.

11. An apparatus for monitoring of a moving medium comprising an supply voltage source;

an electrical sensor having a first terminal connected indirectly to the supply voltage source and having a second terminal delivering an output signal (Uas) changed by changing a position of a moving medium to be detected;

a feedback circuit connected to the second terminal of the electrical sensor and to the supply voltage source, wherein the output signal (Uas) of the sensor is fed back in a feedback loop to the first terminal of the electrical sensor for suppressing relatively slowly changing interference values of less than an absolute value of ±0.5 V/min., wherein the first terminal of the electrical sensor is subjected to an adjustable input supply voltage (Ubs) delivered through the feedback circuit from the supply voltage source, and wherein a sufficiently fast change of the output signal (Uas) of the sensor relative to a quiescent output signal (Uw) of more than 0.01 V/sec. of the electrical sensor, while the medium is absent or in a rest condition, opens up the feedback loop in case of a spatially-geometric position change of the medium, and wherein the opening of the feedback loop is interpreted as a local change of the medium configuration.

12. The apparatus according to claim 11, wherein the feedback circuit includes a switching element connected to the second terminal of the sensor, wherein the output signal (Uas) of the sensor, having a value of from about 0 to 5 volts, is fed back through the switching element to the first terminal of the sensor in case of a voltage change of less than 40 mV/sec, wherein the switching element is capable of opening up the feedback circuit connecting the supply voltage source and the second terminal for adjusting the voltage (Ubs) supplied to the first terminal upon a sufficiently quick or, respectively, sufficiently jumpy change of more than 0.01 V/sec. of the output signal (Uas) of the sensor for purposes of separating the supply voltage source (Ubs) from the sensor.

13. The apparatus according to claim 11, wherein the feedback circuit includes
   a Schmitt trigger having a first input connected to the second terminal, having a second input connected to a second reference voltage, having a third input connected to a third reference voltage, and having an output terminal;
   a comparator having a first input connected to the second terminal, having a second input connected to a first reference voltage, and delivering an output signal, where in each case the output signal (Uas) of the sensor is applied to the first input of the Schmitt trigger and to the first input of the comparator, wherein the output terminal of the comparator delivers a control signal;
   a first switch having a first terminal connected to the first terminal of the sensor, having a second terminal wherein a switching section of the first switch is placed following to the supply voltage source, wherein the first switch is controlled by the output of the Schmitt trigger.

14. The apparatus according to claim 13, further comprising
   a change-over switch controlled by the output signal of the comparator and having a first terminal connected to the second terminal of the first switch for delivering a common output, having a second terminal, having a third terminal;
   a charging resistor having a first end connected to the second terminal of the change-over switch and having a second end connected to a voltage source;
   a discharge resistor having a first end connected to the third terminal of the change-over switch and having a second terminal connected to ground;
   a capacitor having a first end connected to the first terminal of the first switch and having a second end connected to ground, wherein the first resistor, the second resistor, the change-over switch, the first switch, and the capacitor form a charging pump, wherein the electrical sensor is a capacitive sensor, where the capacitive sensor is disposed following to the charging pump, wherein the supply voltage for the capacitor of the charging pump is connected at the second terminal of the change-over switch through a charging resistor, wherein the capacitor of the charging pump follows to the first switch, and wherein the supply voltage level delivered to the sensor is disposed within a fluctuation width;
   an envelope modulator disposed between the first terminal of the first switch and the first terminal of the electrical sensor and having an input connected to the first terminal of the first switch and having an output connected to the first terminal of the electrical sensor;
   a low-pass filter disposed between the second terminal of the electrical sensor and both the first input of the Schmitt trigger and the first input the comparator and having an input connected to the second terminal of the electrical sensor and having an output;
   an impedance converter disposed between the low-pass filter and both the first input of the Schmitt trigger and the first input of the comparator and having an input connected to the output of the low-pass filter and having an output connected to the first input of the Schmitt trigger and to the first input of the comparator.

15. A method for a monitoring of a moving medium (1), in particular measuring a position of a moving medium to be detected, under employing of an electrical sensor (2), wherein the electrical sensor (2) is subjected at its input indirectly to an adjustable input supply voltage source (Ubs) or an input supply current source, wherein
   the output signal (Uas) of the electrical sensor (2) is changed together with changing the position of the moving medium to be detected and is fed back in a feedback loop (7, 14, 9, 10) to the input of the electrical sensor (2) or, respectively, to the supply voltage (Ubs) of the electrical sensor (2) for a suppression of slowly changing interfering values, where said slowly changing interfering values are capable of provoking a change of the output signal, where said change is less than ±0.5 V/min. or, respectively, relative to temperature less than ±5° C./min., such as temperature and/or dusting and/or wetting, and wherein the feedback loop is formed such that the input supply voltage source (Ubs) of the sensor, which is changeable for adjustment of the sensitivity, changes in dependence on the output signal (Uas) of the electrical sensor (2) such that a substantially constant sensitivity is present at all times, and wherein, upon occurrence of a sufficiently fast or, respectively, sufficiently jumpy change, such as larger than 0.01 V/sec., of the output signal (Uas) of the electrical sensor (2) relative to a quiescent output signal (Uw) after absence or, respectively, upon presence of the medium (1) in case of a spatial-geometrically moving medium (1), the feedback loop is opened and the interruption of the feedback loop is interpreted as a local change of the medium (1), where the local change is larger than 0.5 mm.

16. The method according to claim 15, wherein change of the output signal (Uas) of the electrical sensor (2) is subjected to a threshold value measurement and wherein, upon reaching of a predetermined threshold value, the feedback loop is opened up toward the supply voltage source (Ubs) or the supply current source for separating the supply voltage source (Ubs) or the supply current source from the electrical sensor (2).

17. The method according to claim 15, wherein a spatial geometric movement of the medium (1) is interpreted as standstill in case a variation of the output voltage (ΔUas) of the sensor is smaller or equal to an absolute value of 40 mV.

18. An apparatus for monitoring a moving medium (1), in particular for measuring a position of a moving medium to be detected, with an electrical sensor (2), where an input of the electrical sensor is subjected to an adjustable input supply voltage source (Ubs) or an input supply current source, wherein an output signal (Uas) of the electrical sensor (2) changes together with changing the position of the moving medium to be detected, and wherein the output signal (Uas) of the electrical sensor (2) is fed back in a feedback loop to the input of the electrical sensor (2) for suppressing relatively slowly changing interference values of the output signal (Uas), and wherein a sufficiently quick or jumpy change of the output signal (Uas) of the electrical sensor (2) relative to a quiescent output signal (Uw), set for absence or rest of the medium (1), opens up the feedback loop, and wherein the interruption of the feedback loop is interpreted as a local change of the medium (1).

19. The apparatus according to claim 18, wherein the output signal (Uas) of the electrical sensor (2) is fed back through a switching element (7, 8) to the input of the electrical sensor (2), where a value of the output signal (Uas) is between zero to 5 volts, in case of a voltage change of the output signal (Uas) of the electrical sensor (2) having an absolute value ($\Delta u$) smaller than 40 mV, and wherein the switching element (7, 8) is capable of opening up the feedback loop relative to the supply voltage source (Ubs) or the supply current source in response to a sufficiently quick or, respectively, a sufficiently jumpy change of a value larger than 0.01 mV/sec of the output signal (Uas) of the sensor electrical (2) for purposes of separating the supply voltage source (Ubs) or the supply current source from the electrical sensor (2).

20. The apparatus according to claim 19, wherein the switching element includes a Schmitt trigger (8) and a comparator (7), where the output signal (Uas) of the electrical sensor (2) is applied to an input of the Schmitt trigger (8) and to an input of the comparator (7) for comparing to the quiescent output signal (Uw), wherein an output of the comparator (7) forms the feedback loop, wherein a switch (10) is placed in the feedback loop following to the supply voltage source (Ubs) or supply current source, wherein the switch (10) is controlled by an output of the Schmitt trigger (8).

21. The apparatus according to claim 20 wherein the electrical sensor (2) is a capacitive sensor (2), where the capacitive sensor (2) follows to a charging pump (C1; R1), and wherein the output of the comparator (7) is applied to a change-over switch (9) having a common output (9') connected to the switch (10), a second contact (9") and a third contact (9'''), and having a first work position by connecting the common output (9') to the second contact (9"), and a second work position by connecting the common output (9') to the third contact (9'''), wherein a supply voltage for a capacitor (C1) of the charging pump (C1; R1) is connected at the second contact (9") of the change-over switch (9) through a charging resistor (R1), and wherein a discharge resistor (R2) is connected at a third contact (9''') of the change-over switch (9), wherein the capacitor (C1) of the charging pump (C1; R1) follows to the switch (10), and wherein the supply voltage (Ubs) of the sensor (2) is disposed within a fluctuation width.

22. The apparatus according to claim 21, wherein the output signal (Uas) of the electrical sensor (2) is a high-frequency output alternating voltage (Uas) and is led through a rectifier and a low-pass filter (5), wherein the rectifier and the low-pass filter (5) generate a direct current voltage from the high-frequency output alternating voltage (Uas) of the sensor, where the frequency of the alternating voltage (Uas) is in a region between f=0.1 MHz–5 MHz, wherein the direct current voltage is then passed through an impedance converter (6) and is available as a rectified output signal ($U_e$) having a value between zero and 5 volts.

23. The apparatus according to claim 20, wherein the command variable of the automatic control, which is placed to the lower threshold value (Us) of the comparator (7), is the quiescent output signal (Uw) of the electrical sensor (2) in case of an absence or rest of the medium (1), wherein the quiescent output signal (Uw) is selected to be small and is in the region of 10% of the maximum direct current voltage ($U_{emax}$), Uw=1/10 $U_{emax}$, and where the direct current voltage ($U_e$) after the impedance convertor (6) is proportional to the output signal (Uas) of the electrical sensor (2) and is preferably between zero and 5 volts.

24. The apparatus according to claim 20, wherein a resistance of the discharge resistor (R2) of the change-over switch (9) is in a region of from 100 to 1000 times larger than the resistance of the charging resistor (R1), where (R2≈(100 . . . 1000)×R1).

25. The apparatus according to claim 18, wherein the sensor is an inductive sensor.

26. The apparatus according to claim 22, wherein the change-over switch is switched in the first position in case when a value of the direct current voltage ($U_e$) is smaller than the quiescent output signal (Uw) and wherein the change-over switch is switched in the second position in case when a value of the direct current voltage ($U_e$) is larger than the quiescent output signal (Uw) for disposing the supply voltage (Ubs) of the sensor (2) within the fluctuation width.

27. The apparatus according to claim 18, wherein the sensor is a light-sensitive sensor.

* * * * *